US009191876B2

(12) United States Patent
Ma (10) Patent No.: US 9,191,876 B2
(45) Date of Patent: Nov. 17, 2015

(54) METHOD AND DEVICE FOR TESTING CELL RESELECTION CAPABILITY OF TERMINAL

(75) Inventor: Wei Ma, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 91 days.

(21) Appl. No.: 13/879,796

(22) PCT Filed: Jul. 20, 2011

(86) PCT No.: PCT/CN2011/077385
§ 371 (c)(1),
(2), (4) Date: Apr. 16, 2013

(87) PCT Pub. No.: WO2012/051873
PCT Pub. Date: Apr. 26, 2012

(65) Prior Publication Data
US 2013/0203421 A1   Aug. 8, 2013

(30) Foreign Application Priority Data
Oct. 21, 2010   (CN) .......................... 2010 1 0515500

(51) Int. Cl.
*H04W 36/32*   (2009.01)
*H04W 24/06*   (2009.01)
*H04W 88/04*   (2009.01)

(52) U.S. Cl.
CPC .............. *H04W 36/32* (2013.01); *H04W 24/06* (2013.01); *H04W 88/04* (2013.01)

(58) Field of Classification Search
CPC ..... H04W 36/08; H04W 72/02; H04W 88/06; H04W 52/367; H04W 36/32; H04W 64/00; H04W 4/027; H04W 52/04; H04J 11/0093
USPC ................... 455/436, 437, 522, 441; 370/332
See application file for complete search history.

(56) References Cited

U.S. PATENT DOCUMENTS

| 7,379,739 B2 | 5/2008 | Rajkotia et al. |
| 7,668,548 B2 | 2/2010 | Choi |

(Continued)

FOREIGN PATENT DOCUMENTS

| CN | 1503580 A | 6/2004 |
| CN | 1541017 A | 10/2004 |

(Continued)

OTHER PUBLICATIONS

Konstantinos Dimou, Handover within 3GPP LTE: Design Principles and Performance; 2009, IEEE, 978-1-4244-2515.*
International Search Report in international application No. PCT/CN2011/077385, mailed on Oct. 27, 2011.
English Translation of the Written Opinion of the International Search Authority in international application No. PCT/CN2011/077385, mailed on Oct. 27, 2011.

*Primary Examiner* — Lester Kincaid
*Assistant Examiner* — Gary Lafontant
(74) *Attorney, Agent, or Firm* — Oppendahl Patent Law Firm LLC; Carl Oppendahl; Micah Gunn (57) ABSTRACT

The disclosed refers to a method for testing a cell reselection capability of a terminal. The method comprises: adjusting a terminal to camp on a current cell and to enter a high-speed or intermediate-speed mobile mode (101); adjusting transmission power of the current cell and a neighboring cell, so that the current cell and the neighboring cell satisfy a condition of reselection from the current cell to the neighboring cell in the high-speed or intermediate-speed mobile mode (102); and maintaining the adjusted transmission power, and after a preset time threshold is reached, detecting whether the terminal camps on the neighboring cell to confirm whether the terminal successfully performs cell reselection (103). The disclosure implements the test on whether the terminal has a cell reselection capability in the high-speed or intermediate-speed mobile state, so that whether the terminal has the cell reselection capability can be approved and tested in actual production.

13 Claims, 3 Drawing Sheets

(56) References Cited

U.S. PATENT DOCUMENTS

| | | |
|---|---|---|
| 2004/0097234 A1 | 5/2004 | Rajkotia et al. |
| 2006/0234757 A1 | 10/2006 | Choi |
| 2010/0298001 A1* | 11/2010 | Dimou et al. .................. 455/441 |
| 2011/0045833 A1* | 2/2011 | Kazmi .......................... 455/436 |
| 2014/0066074 A1* | 3/2014 | Folke et al. ................... 455/437 |

FOREIGN PATENT DOCUMENTS

| | | |
|---|---|---|
| CN | 1599473 A | 3/2005 |
| CN | 101316400 A | 12/2008 |
| CN | 101442796 A | 5/2009 |
| EP | 1713292 A1 | 10/2006 |

\* cited by examiner

METHOD AND DEVICE FOR TESTING CELL RESELECTION CAPABILITY OF TERMINAL

TECHNICAL FIELD

The disclosure relates to the technology of testing terminal capabilities in Long Term Evolution (LTE) technologies, and more particularly to a method and device for testing a cell reselection capability of a terminal.

BACKGROUND

Code division multiple access is applied in the $3^{rd}$ Generation (3G) communication technology to support multimedia services, and better communication security and communication quality are provided compared with the $2^{nd}$ Generation (2G) communication technology, thus 3G will be more competitive in the future few years. In order to satisfy higher communication requirements, to provide better communication services and ensure higher competitiveness of 3G technologies, 3G LTE research projects have been started by the $3^{rd}$ Generation Partnership Project (3GPP).

Currently, a complete wireless communication standard has been formed for LTE and is being promoted gradually all over the world, and LTE test networks and LTE test terminals are also under gradual construction. With the gradual popularization and development of the LTE technology, LTE terminals will inevitably become mainstream devices in the communication market in the future. Signaling establishing processes for initiating a call to a terminal and data processes have been defined clearly in existing LTE standard technologies, and terminal products can be developed and manufactured according to technical requirements in the standard. Cell reselection of terminals in an idle state is a basic function of wireless mobile terminals and a basic requirement for mobile terminal. In the meanwhile, high-speed railways at above 350 km/h, including Beijing-Shanghai High-speed Railway and Shanghai-Nanjing High-speed Railway etc. have been getting more and more involved in our daily life with the progress and development of high-speed railway technologies, which raises higher requirements on mobile communication technologies, especially mobile terminals, and mobile terminals are required to perform communication normally as well during high-speed mobile processes. The support of normal communication capability by terminals during high-speed mobile processes mainly refers to the support of a cell reselection capability and a network switching capability by terminals during high-speed mobile processes. Since the changing frequency of a cell where a terminal locates is accelerated evidently during a high-speed mobile process, higher requirements are raised on the timing and performance time of cell reselection and switching of the terminal. Since switching is controlled by a network side, there are no higher requirements on the timing and switching time of the terminal in a high-speed mobile process during the switching. However, since the cell reselection is determined and processed by the terminal, the terminal during the high-speed mobile process needs to change a cell reselection condition so that the terminal can be selected to a new cell more quickly. In the prior art, reduction of the adjustment value (Qoffset) of the reference signal receiving power of a neighboring cell and shortening of the value of a cell reselection time interval value (TreselectionRAT) are applied when a terminal in a high-speed mobile process performs cell reselection judgment to accelerate cell reselection during the high-speed mobile process.

During a high-speed or intermediate-speed mobile process, a terminal is required to be able to finish cell reselection during a relatively short period of time in the condition that the inter-cell transmission power difference is not large. However, there is no definite method for approving and testing the cell reselection capability of a terminal during actual production, and the cell reselection capability of the terminal needs to be approved and tested when the terminal is connected to a network.

SUMMARY

In view of this, the main purpose of the disclosure is to provide a method and device for testing a cell reselection capability of a terminal to solve the problem that there is no definite method for approving and testing the cell reselection capability of the terminal in the prior art.

To realize the purpose above, the technical scheme of the disclosure is realized by the following way.

The disclosure provides a method for testing a cell reselection capability of a terminal, which includes:

adjusting a terminal to camp on a current cell and to enter a high-speed or an intermediate-speed mobile mode;

adjusting transmission power of the current cell and a neighboring cell, so that the current cell and the neighboring cell satisfy a condition of reselection from the current cell to the neighboring cell in the high-speed or intermediate-speed mobile mode; and maintaining the adjusted transmission power, and detecting whether the terminal camps on the neighboring cell after a preset time threshold is reached; if yes, the terminal has a cell reselection capability in the high-speed or intermediate-speed mobile mode; otherwise, the terminal does not have a cell reselection capability in the high-speed or intermediate-speed mobile mode.

In the scheme above, the adjusting a terminal to camp on a current cell and to enter a high-speed or an intermediate-speed mobile mode may include: adjusting, by a system simulator, the transmission power of the current cell and the neighboring cell for many times, so that the terminal switches between the current cell and the neighboring cell for many times and enters the high-speed or intermediate-speed mobile mode.

In the scheme above, the adjusting transmission power of the current cell and a neighboring cell so that the current cell and the neighboring cell satisfy a condition of reselection from the current cell to the neighboring cell in the intermediate-speed mobile mode may include: adjusting, by a system simulator, the transmission power of the current cell and the neighboring cell, obtaining a reference signal energy level of the neighboring cell, and deducting a reference signal energy adjustment value in the intermediate-speed mobile mode from the reference signal energy level of the neighboring cell, and the obtained value is greater than a reference signal energy level of the current cell.

In the scheme above, the adjusting transmission power of the current cell and a neighboring cell so that the current cell and the neighboring cell satisfy a condition of reselection from the current cell to the neighboring cell in the intermediate-speed mobile mode may further include: adjusting, by the system simulator, the transmission power of the current cell and the neighboring cell, obtaining the reference signal energy level of the neighboring cell, and deducting a reference signal energy adjustment value in a non-mobile mode from the reference signal energy level of the neighboring cell, and the obtained value is less than the reference signal energy level of the current cell, so that the current cell and the neighboring cell do not satisfy a condition of reselection from the current cell to the neighboring cell in the non-mobile mode.

In the scheme above, the adjusting transmission power of the current cell and a neighboring cell so that the current cell and the neighboring cell satisfy a condition of reselection from the current cell to the neighboring cell in the high-speed mobile mode may include: adjusting, by a system simulator, the transmission power of the current cell and the neighboring cell, obtaining a reference signal energy level of the neighboring cell, and deducting a reference signal energy adjustment value in the high-speed mobile mode from the reference signal energy level of the neighboring cell, and the obtained value is greater than a reference signal energy level of the current cell.

In the scheme above, the adjusting transmission power of the current cell and a neighboring cell so that the current cell and the neighboring cell satisfy a condition of reselection from the current cell to the neighboring cell in the high-speed mobile mode may further include: adjusting, by the system simulator, the transmission power of the current cell and the neighboring cell, obtaining the reference signal energy level of the neighboring cell, and deducting a reference signal energy adjustment value in the intermediate-speed mobile mode or in a non-mobile mode from the reference signal energy level of the neighboring cell, and the obtained value is less than the reference signal energy level of the current cell, so that the current cell and the neighboring cell do not satisfy a condition of reselection from the current cell to the neighboring cell in the intermediate-speed mobile mode and/or in the non-mobile mode.

In the scheme above, the method may further include: before or when adjusting transmission power of the current cell and a neighboring cell, presetting, by a system simulator, the time threshold; the preset time threshold may be an intermediate-speed time threshold or a high-speed time threshold; the intermediate-speed time threshold may be greater than a cell reselection time interval value in the intermediate-speed mobile mode, and the high-speed time threshold may be greater than a cell reselection time interval value in the high-speed mobile mode.

In the scheme above, the intermediate-speed time threshold may be further less than a cell reselection time interval value in a non-mobile mode; the high-speed time threshold may be further less than a cell reselection time interval value in the non-mobile mode and in the intermediate-speed mobile mode.

In the scheme above, the detecting whether the terminal camps on the neighboring cell may include: establishing a wireless resource control link between the terminal and the neighboring cell, sending a tracking area updating message to the neighboring cell, returning, by a system simulator, a tracking area updating reception message to the terminal, and detecting whether the neighboring cell receives a tracking area updating completion message sent from the terminal; if yes, the terminal camps on the neighboring cell; otherwise, the terminal does not camp on the neighboring cell.

In the scheme above, the method may further include: after a preset time threshold is reached during maintaining the adjusted transmission power, adjusting, by a system simulator, the transmission power of the current cell and the neighboring cell, so that the transmission power of the current cell and the neighboring cell does not satisfy any condition of cell reselection.

In the scheme above, the step in which a system simulator adjusts the transmission power of the current cell and the neighboring cell so that the transmission power of the current cell and the neighboring cell does not satisfy any condition of cell reselection may include: adjusting, by the system simulator, the transmission power of the current cell to be equal to the transmission power of the neighboring cell.

The disclosure further provides a device for testing a cell reselection capability of a terminal, which includes: a first adjusting unit, a second adjusting unit and a detecting unit, wherein the first adjusting unit is configured to adjust a terminal to camp on a current cell and to enter a high-speed or an intermediate-speed mobile mode;

the second adjusting unit is configured to adjust transmission power of the current cell and a neighboring cell, so that the current cell and the neighboring cell satisfy a condition of reselection from the current cell to the neighboring cell in the high-speed or intermediate-speed mobile mode, to maintain the adjusted transmission power, and to start the detecting unit after a preset time threshold is reached;

the detecting unit is configured to detect whether the terminal camps on the neighboring cell; if yes, the terminal has a cell reselection capability in the high-speed or intermediate-speed mobile mode; otherwise, the terminal does not have a cell reselection capability in the high-speed or intermediate-speed mobile mode.

In the scheme above, the device may further include: a setting unit configured to preset the time threshold; the preset time threshold is an intermediate-speed time threshold or a high-speed time threshold; the intermediate-speed time threshold may be greater than a cell reselection time interval value in the intermediate-speed mobile mode, and the high time threshold may be greater than a cell reselection time interval value in the high-speed mobile mode.

In the scheme above, the second adjusting unit may be further configured, before starting the detecting unit, to adjust the transmission power of the current cell and the neighboring cell so that the transmission power of the current cell and the neighboring cell does not satisfy any condition of cell reselection.

The method and device for testing a cell reselection capability of a terminal of the disclosure can adjust the terminal to the high-speed or intermediate-speed mobile mode first, then adjust the transmission power of the current cell where the terminal camps and the neighboring cell thereof, so that the current cell and the neighboring cell satisfy a condition of reselection from the current cell to the neighboring cell in the high-speed or intermediate-speed mobile mode, and finally, after a preset time threshold is reached, can detect whether the terminal camps on the neighboring cell. A system simulator simulates a cell reselection process performed by the terminal in the high-speed or intermediate-speed mobile mode and detects whether the terminal has camped on a reselected cell successfully to implement the test on whether the terminal has the cell reselection capability in the high-speed or intermediate-speed mobile state to test and verify the performance of the terminal in the intermediate-speed and/or high-speed mobile mode, so that whether the terminal has the cell reselection capability can be approved and tested in actual production.

DETAILED DESCRIPTION

The basic idea of the disclosure is: after a terminal enters a high-speed or an intermediate-speed mobile mode, adjusting transmission power of a current cell where the terminal camps and a neighboring cell thereof, so that the current cell and the neighboring cell satisfy a reselection condition of the terminal from the current cell to the neighboring cell; subsequently, maintaining the adjusted transmission power, and after a preset time threshold is reached, detecting whether the terminal camps on the neighboring cell, i.e., whether the terminal has finished the cell reselection; if yes, the terminal has a cell reselection capability in the high-speed or intermediate-speed mobile mode; otherwise, the terminal does not have a cell reselection capability in the high-speed or intermediate-speed mobile mode.

Figure 1:
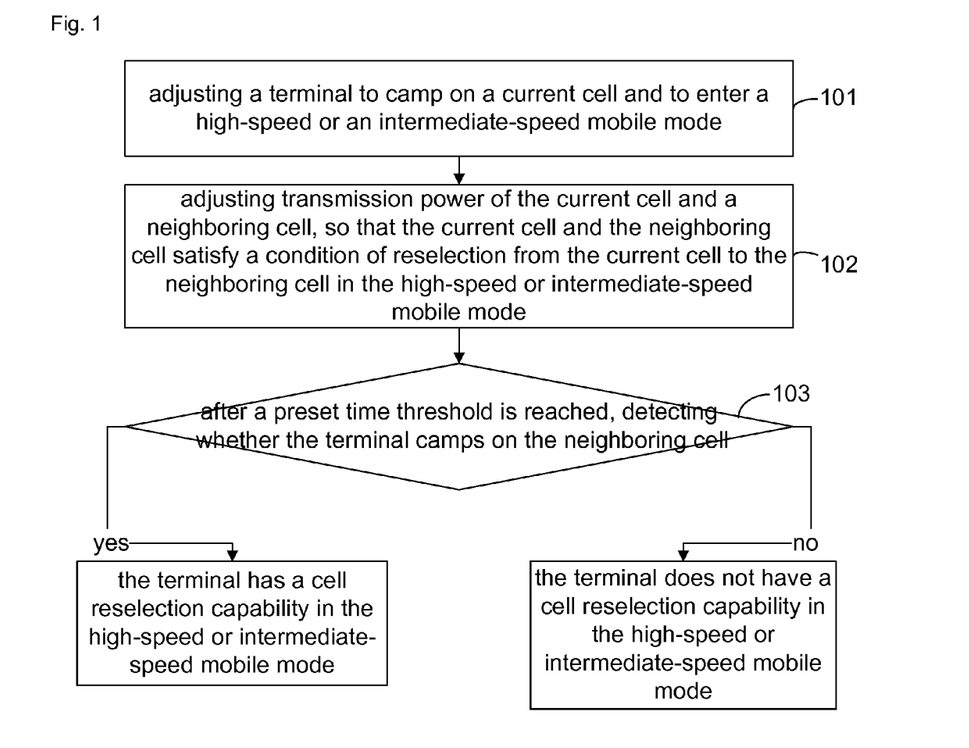
FIG. 1 is a flowchart of a method for testing a cell reselection capability of a terminal of the disclosure.

A method for testing a cell reselection capability of a terminal of the disclosure is shown in FIG. 1, which includes the following steps.

Step 101: adjusting a terminal to camp on a current cell and to enter a high-speed or an intermediate-speed mobile mode;

Step 102: adjusting transmission power of the current cell and a neighboring cell, so that the current cell and the neighboring cell satisfy a condition of reselection from the current cell to the neighboring cell in the high-speed or intermediate-speed mobile mode;

Step 103: maintaining the adjusted transmission power, after a preset time threshold is reached, detecting whether the terminal camps on the neighboring cell. If yes, the terminal has a cell reselection capability in the high-speed or intermediate-speed mobile mode; otherwise, the terminal does not have a cell reselection capability in the high-speed or intermediate-speed mobile mode.

Here, the process of testing the cell reselection capability of the terminal may be performed by a system simulator which is equal to a base station, wherein the adjusting a terminal to camp on a current cell and to enter a high-speed or an intermediate-speed mobile mode may include: the system simulator adjusts the transmission power of the current cell and the neighboring cell for many times, so that the terminal switches between the current cell and the neighboring cell for many times and enters the high-speed or intermediate-speed mobile mode, wherein the process of adjusting transmission power of the current cell and a neighboring cell so that the current cell and the neighboring cell satisfy a condition of reselection from the current cell to the neighboring cell in the intermediate-speed mobile mode may include: the system simulator adjusts the transmission power of the current cell and the neighboring cell, obtains a reference signal energy level of the neighboring cell, and deducts a reference signal energy adjustment value in the intermediate-speed mobile mode from the reference signal energy level of the neighboring cell, and the obtained value is greater than a reference signal energy level of the current cell.

Specifically, the reference signal energy level of the cell corresponds to the transmission power thereof. Therefore, the system simulator may reduce the transmission power of the current cell and/or increase the transmission power of the neighboring cell, so that the reference signal energy levels of the neighboring cell and the current cell satisfy the requirements above.

Here, the process of adjusting transmission power of the current cell and a neighboring cell so that the current cell and the neighboring cell satisfy a condition of reselection from the current cell to the neighboring cell in the intermediate-speed mobile mode may further include: the system simulator adjusts the transmission power of the current cell and the neighboring cell, obtains the reference signal energy level of the neighboring cell, and deducts a reference signal energy adjustment value in a non-mobile mode from the reference signal energy level of the neighboring cell, and the obtained value is less than the reference signal energy level of the current cell, so that the current cell and the neighboring cell do not satisfy a condition of reselection from the current cell to the neighboring cell in the non-mobile mode, wherein the process of adjusting transmission power of the current cell and a neighboring cell so that the current cell and the neighboring cell satisfy a condition of reselection from the current cell to the neighboring cell in the high-speed mobile mode may include: the system simulator adjusts the transmission power of the current cell and the neighboring cell, obtains a reference signal energy level of the neighboring cell, and deducts a reference signal energy adjustment value in the high-speed mobile mode from the reference signal energy level of the neighboring cell, and the obtained value is greater than a reference signal energy level of the current cell.

Here, the process of adjusting transmission power of the current cell and a neighboring cell so that the current cell and the neighboring cell satisfy a condition of reselection from the current cell to the neighboring cell in the high-speed mobile mode may further include: the system simulator adjusts the transmission power of the current cell and the neighboring cell, obtains the reference signal energy level of the neighboring cell, and deducts a reference signal energy adjustment value in the intermediate-speed mobile mode or in a non-mobile mode, and the obtained value is less than the reference signal energy level of the current cell, so that the current cell and the neighboring cell do not satisfy a condition of reselection from the current cell to the neighboring cell in the intermediate-speed mobile mode and/or non-mobile mode, wherein before or when adjusting transmission power of the current cell and a neighboring cell, the method further includes: the system simulator presets the time threshold; the preset time threshold is an intermediate-speed time threshold or a high-speed time threshold; the intermediate-speed time threshold is greater than a cell reselection time interval value in the intermediate-speed mobile mode; the high-speed time threshold is greater than a cell reselection time interval value in the high-speed mobile mode.

Here, the intermediate-speed time threshold is further less than a cell reselection time interval value in a non-mobile mode; the high-speed time threshold is further less than a cell reselection time interval value in the non-mobile mode and in the intermediate-speed mobile mode, wherein the process of detecting whether the terminal camps on the neighboring cell may include: establishing a wireless resource control link between the terminal and the neighboring cell, sending a tracking area updating message to the neighboring cell, then the system simulator returns a tracking area updating reception message to the terminal, and detects whether the neighboring cell receives a tracking area updating completion message sent from the terminal; if yes, the terminal camps on the neighboring cell; otherwise, the terminal does not camp on the neighboring cell, wherein before detecting whether the terminal camps on the neighboring cell, the method further includes: the system simulator adjusts the transmission power of the current cell and the neighboring cell, so that the transmission power of the current cell and the neighboring cell does not satisfy any condition of cell reselection.

Here, the step in which the system simulator adjusts the transmission power of the current cell and the neighboring cell so that the transmission power of the current cell and the neighboring cell does not satisfy any condition of cell reselection may include: the system simulator adjusts the transmission power of the current cell to be equal to the transmission power of the neighboring cell, wherein the transmission power of the current cell and the transmission power of the neighboring cell may be further adjusted to other relations as long as the transmission power of the current cell and the transmission power of the neighboring cell do not satisfy any condition of cell reselection. Specifically, the transmission power of the neighboring cell may be reduced separately, or the transmission power of the current cell may be increased separately during the adjustment, so that the transmission power of the current cell and the neighboring cell does not satisfy any condition of cell reselection.

To realize the method above, the disclosure further provides a device for testing a cell reselection capability of a terminal. The device mainly includes: a first adjusting unit, a second adjusting unit and a detecting unit; wherein the first adjusting unit is configured to adjust a terminal to camp on a current cell and to enter a high-speed or an intermediate-speed mobile mode; the second adjusting unit is configured to adjust transmission power of the current cell and a neighboring cell, so that the current cell and the neighboring cell satisfy a condition of reselection from the current cell to the neighboring cell in the high-speed or intermediate-speed mobile mode, to maintain the adjusted transmission power, and to start the detecting unit after a preset time threshold is reached; the detecting unit is configured to detect whether the terminal camps on the neighboring cell; if yes, the terminal has a cell reselection capability in the high-speed or intermediate-speed mobile mode; otherwise, the terminal does not have a cell reselection capability in the high-speed or intermediate-speed mobile mode, wherein the device further includes: a setting unit configured to preset the time threshold; the preset time threshold is an intermediate-speed time threshold or a high-speed time threshold; the intermediate-speed time threshold is greater than a cell reselection time interval value in the intermediate-speed mobile mode; and the high time threshold is greater than a cell reselection time interval value in the high-speed mobile mode.

Before starting the detecting unit, the second adjusting unit is further configured to adjust the transmission power of the current cell and the neighboring cell so that the transmission power of the current cell and the neighboring cell does not satisfy any condition of cell reselection.

During actual application, the device for testing a cell reselection capability of a terminal may be set in a system simulator or set separately to finish the test on the cell reselection capability of the terminal. A specific process for implementing the test on the cell reselection capability of the terminal is realized by the device. Please refer to the specific implementation process of the method above and the specific implementation process of each embodiment below, and the process for implementing the test on the cell reselection capability of the terminal will not be repeated here.

Embodiment 1

Figure 2:
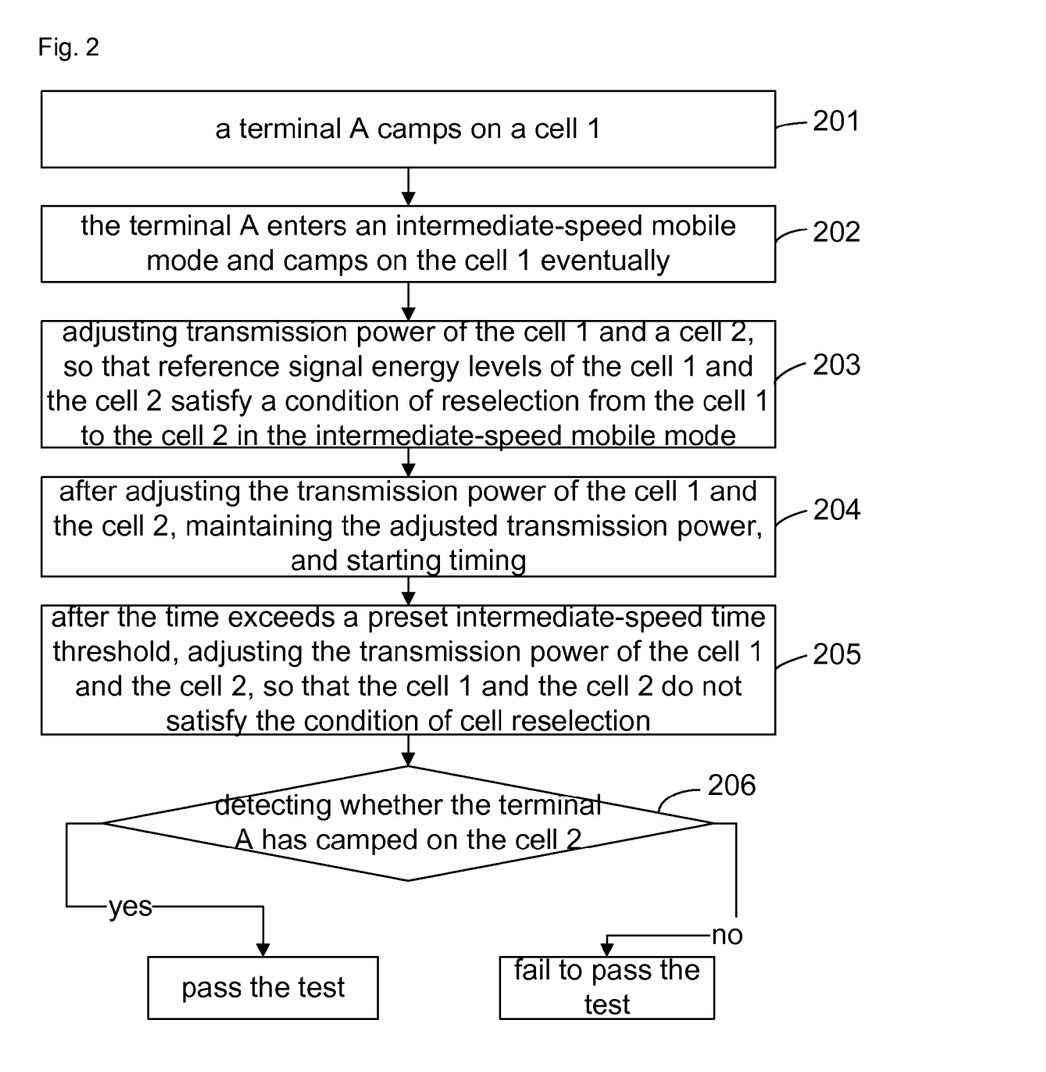
FIG. 2 is a flowchart of a method for testing a cell reselection capability of a terminal in an intermediate-speed mobile mode in a first embodiment of the disclosure.

As shown in FIG. 2, a process for testing a cell reselection capability of a terminal in an intermediate-speed mobile mode may specifically include the following steps:

Step 201: a terminal A camps on a cell 1;

Step 202: the terminal A enters an intermediate-speed mobile mode and camps on the cell 1 eventually;

here, a system simulator changes the transmission power of the cell 1 and a cell 2 for many times, so that the terminal A enters the intermediate-speed mobile mode after performing switching for many times between the cell 1 and the cell 2, and camps on the cell 1 eventually.

Here, the cell 1 and the cell 2 are neighboring cells. Specifically, the transmission power of the cell 1 and the cell 2 is changed, so that the transmission power of the cell 1 is far greater than the transmission power of the cell 2, or the transmission power of the cell 2 is far greater than the transmission power of the cell 1 to enable the terminal A to switch between the cell 1 and the cell 2. Finally, the transmission power of the cell 1 is far greater than the transmission power of the cell 2, so that the terminal A camps on the cell 1 eventually.

Step 203: the system simulator adjusts the transmission power of the cell 1 and the cell 2, obtains a reference signal energy level of the cell 2, and deducts a reference signal energy adjustment value in the intermediate-speed mobile mode from the reference signal energy level of the cell 2, and the obtained value is greater than a reference signal energy level of the cell 1; and a value obtained by deducting a reference signal energy adjustment value in a non-mobile state from the reference signal energy level of the cell 2 is less than the reference signal energy level of the cell 1, so that the reference signal energy levels of the cell 1 and the cell 2 satisfy a condition of reselection from the cell 1 to the cell 2 in the intermediate-speed mobile mode;

Step 204: after adjusting the transmission power of the cell 1 and the cell 2, the system simulator maintains the adjusted transmission power and starts timing;

Step 205: after the time exceeds a preset intermediate-speed time threshold, the system simulator adjusts the transmission power of the cell 1 and the cell 2, so that the cell 1 and the cell 2 do not satisfy the condition of cell reselection;

here, the system simulator may adjust the reference signal energy level of the cell 1 to be equal to the reference signal energy level of the cell 2, so that the cell 1 and the cell 2 do not satisfy the condition of inter-cell reselection.

Here, the preset intermediate-speed time threshold is greater than a time interval value of cell reselection performed by the terminal in the intermediate-speed mobile mode, and less than a cell reselection time interval value in a non-mobile mode.

The preset intermediate-speed time threshold may be preset by the system simulator before or when the transmission power of the cell 1 and the cell 2 is adjusted in step 203, and the setting method may be static configuration or other setting methods.

Step 206: detecting whether the terminal A has camped on the cell 2; if the terminal A has camped on the cell 2, the terminal A passes the test, i.e., the terminal A has the cell reselection capability in the intermediate-speed mobile mode; if the terminal A does not camp on the cell 2, the terminal A fails to pass the test, i.e., the terminal A does not have the cell reselection capability in the intermediate-speed mobile mode.

Embodiment 2

Figure 3:
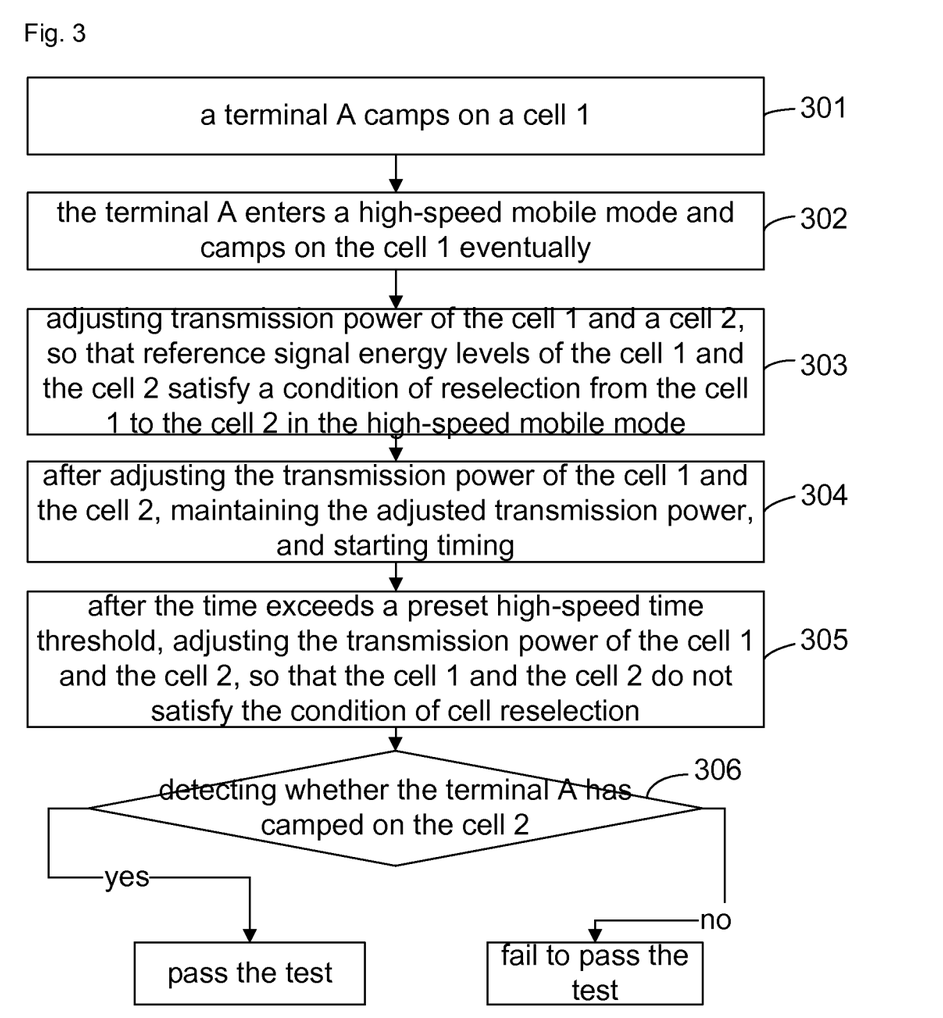
FIG. 3 is a flowchart of a method for testing a cell reselection capability of a terminal in a high-speed mobile mode in a second embodiment of the disclosure.

As shown in FIG. 3, a process for testing a cell reselection capability of a terminal in a high-speed mobile mode in this embodiment may specifically include the following steps:

Step 301: a terminal A camps on a cell 1;

Step 302: the terminal A enters a high-speed mobile mode and camps on the cell 1 eventually;

here, a system simulator changes the transmission power of the cell 1 and a cell 2 for many times, so that the terminal A enters the high-speed mobile mode after performing switching for many times between the cell 1 and the cell 2, and camps on the cell 1 eventually.

Specifically, system information sent from a system simulator to the terminal may include a maximum number of cell reselection times (Ncr-h) in a high-speed mobile state, a maximum number of cell mobile times (Ncr-m) in an intermediate-speed mobile state and an evaluation time value (Tcr) of the number of cell reselection times, wherein Ncr-h>Ncr-m. If the number of cell reselection times is greater than Ncr-m and less than Ncr-h within any period of time which is equal to TCR, the terminal enters the intermediate-speed mobile mode. If the number of cell reselection times is greater than Ncr-h, the terminal enters the high-speed mobile mode.

Here, the cell 1 and the cell 2 are neighboring cells. Specifically, the transmission power of the cell 1 and the cell 2 is changed, so that the transmission power of the cell 1 is far greater than the transmission power of the cell 2, or the transmission power of the cell 2 is far greater than the transmission power of the cell 1 to enable the terminal A to switch between the cell 1 and the cell 2. Finally, the transmission power of the cell 1 is far greater than the transmission power of the cell 2, so that the terminal A camps on the cell 1 eventually.

Step 303: the system simulator adjusts the transmission power of the cell 1 and the cell 2, obtains a reference signal energy level of the cell 2, and deducts a reference signal energy adjustment value in the high-speed mobile mode from the reference signal energy level of the cell 2, and the obtained value is greater than a reference signal energy level of the cell 1; and a value obtained by deducting a reference signal energy adjustment value of the terminal in an intermediate-speed mobile or in a non-mobile state from the reference signal energy level of the cell 2 is less than the reference signal energy level of the cell 1, so that the reference signal energy levels of the cell 1 and the cell 2 satisfy a condition of reselection from the cell 1 to the cell 2 in the high-speed mode;

Step 304: after adjusting the transmission power of the cell 1 and the cell 2, the system simulator maintains the adjusted transmission power and starts timing;

Step 305: after the time exceeds a preset high-speed time threshold, the system simulator adjusts the transmission power of the cell 1 and the cell 2 automatically, so that the cell 1 and the cell 2 do not satisfy the condition of cell reselection;

here, the system simulator may adjust the reference signal energy level of the cell 1 to be equal to the reference signal energy level of the cell 2, so that the cell 1 and the cell 2 do not satisfy the condition of inter-cell reselection.

Here, the preset high-speed time threshold is greater than a time interval value of cell reselection performed by the terminal in the high-speed mobile mode, and less than a cell reselection time interval value in the intermediate-speed or non-mobile mode.

The preset high-speed time threshold may be preset by the system simulator before or when the transmission power of the cell 1 and the cell 2 is adjusted in step 303, and the setting method may be static configuration or other setting methods.

Step 306: detecting whether the terminal A has camped on the cell 2; if the terminal A has camped on the cell 2, the terminal A passes the test, i.e., the terminal A has the cell reselection capability in the high-speed mobile mode; if the terminal A does not camp on the cell 2, the terminal A fails to pass the test, i.e., the terminal A does not have the cell reselection capability in the high-speed mobile mode.

The above are only preferred embodiments of the disclosure and should not be used to limit the disclosure. Any modifications, equivalent replacements, improvements and the like within the spirit and principle of the disclosure shall fall within the scope of protection of the disclosure.

What is claimed is:

1. A method for testing a cell reselection capability of a terminal, comprising:

adjusting a terminal to camp on a current cell and to enter a high-speed mobile mode or an intermediate-speed mobile mode;

adjusting transmission power of the current cell and transmission power of a neighboring cell, so that a condition of reselection from the current cell to the neighboring cell in the high-speed mobile mode or in the intermediate-speed mobile mode is met; and maintaining the adjusted transmission power for at least a preset time threshold, and detecting whether the terminal has a cell reselection capability in the high-speed mobile mode or in the intermediate-speed mobile mode by detecting whether the terminal camps on the neighboring cell; when the terminal camps on the neighboring cell, it is determined that the terminal has a cell reselection capability in the high-speed mobile mode or in the intermediate-speed mobile mode; otherwise when the terminal fails to camp on the neighboring cell, it is determined that the terminal does not have a cell reselection capability in the high-speed mobile mode or in the intermediate-speed mobile mode, wherein the adjusting transmission power of the current cell and transmission power of a neighboring cell, so that a condition of reselection from the current cell to the neighboring cell in the high-speed mobile mode or in the intermediate-speed mobile mode is met comprises: reducing the transmission power of the current cell and/or increasing the transmission power of the neighboring cell, so that reference signal energy levels of the neighboring cell and the current cell satisfy the condition of reselection from the current cell to the neighboring cell in the high-speed mobile mode or in the intermediate-speed mobile mode, wherein a reference signal energy level of a cell corresponds to transmission power of the cell, wherein the adjusting a terminal to camp on a current cell and to enter a high-speed mobile mode or an intermediate-speed mobile mode comprises:

adjusting, by a system simulator, the transmission power of the current cell and the neighboring cell for many times, so that the terminal switches between the current cell and the neighboring cell for many times and enters the high-speed or intermediate-speed mobile mode, and then camps on the current cell, wherein the transmission power of the current cell and the neighboring cell is adjusted repeatedly, either making the transmission power of the current cell far greater than the transmission power of the neighboring cell, or making the transmission power of the neighboring cell far greater than the transmission power of the current cell, such that the terminal performs cell reselection and switches between the current cell and the neighboring cell for a number of times within a period of time Tcr, and then the transmission power of the current cell is adjusted to be far greater than the transmission power of the neighboring cell, making the terminal camp on the current cell, wherein system information sent by the system simulator to the terminal includes a first integer (Ncr-h), a second integer (Ncr-m), and the time value (Tcr), with Ncr-h>Ncr-m; wherein the terminal enters the intermediate-speed mobile mode when the number of times is greater than the Ncr-m and less than the Ncr-h, or the terminal enters the high-speed mobile mode when the number of times is greater than the Ncr-h.

2. The method for testing a cell reselection capability of a terminal according to claim 1, wherein the condition of reselection from the current cell to the neighboring cell in the intermediate-speed mobile mode comprises that: a value obtained by deducting a reference signal energy adjustment value in the intermediate-speed mobile mode from the reference signal energy level of the neighboring cell is greater than the reference signal energy level of the current cell.

3. The method for testing a cell reselection capability of a terminal according to claim 2, wherein the condition of reselection from the current cell to the neighboring cell in the intermediate-speed mobile mode further comprises that: a value obtained by deducting a reference signal energy adjustment value in a non-mobile mode from the reference signal energy level of the neighboring cell is less than the reference signal energy level of the current cell.

4. The method for testing a cell reselection capability of a terminal according to claim 1, wherein the condition of reselection from the current cell to the neighboring cell in the high-speed mobile mode comprises that: a value obtained by deducting a reference signal energy adjustment value in the high-speed mobile mode from the reference signal energy level of the neighboring cell is greater than the reference signal energy level of the current cell.

5. The method for testing a cell reselection capability of a terminal according to claim 4, wherein the condition of reselection from the current cell to the neighboring cell in the high-speed mobile mode further comprises that: a value obtained by deducting a reference signal energy adjustment value in the intermediate-speed mobile mode or in a non-mobile mode from the reference signal energy level of the neighboring cell is less than the reference signal energy level of the current cell.

6. The method for testing a cell reselection capability of a terminal according to claim 1, further comprising: before or when adjusting transmission power of the current cell and a neighboring cell, presetting, by a system simulator, the time threshold, wherein the preset time threshold is an intermediate-speed time threshold or a high-speed time threshold; the intermediate-speed time threshold is greater than a cell reselection time interval value in the intermediate-speed mobile mode, and the high-speed time threshold is greater than a cell reselection time interval value in the high-speed mobile mode.

7. The method for testing a cell reselection capability of a terminal according to claim 6, wherein the intermediate-speed time threshold is further less than a cell reselection time interval value in a non-mobile mode; the high-speed time threshold is further less than a cell reselection time interval value in the non-mobile mode and in the intermediate-speed mobile mode.

8. The method for testing a cell reselection capability of a terminal according to claim 1, wherein the detecting whether the terminal camps on the neighboring cell comprises:

establishing a wireless resource control link between the terminal and the neighboring cell, sending a tracking area updating message to the neighboring cell, returning, by a system simulator, a tracking area updating reception message to the terminal, and detecting whether the neighboring cell receives a tracking area updating completion message sent from the terminal; if yes, the terminal camps on the neighboring cell; otherwise, the terminal does not camp on the neighboring cell.

9. The method for testing a cell reselection capability of a terminal according to claim 1, further comprising: after the maintaining the adjusted transmission power for at least a preset time threshold and before the detecting whether the terminal camps on the neighboring cell, adjusting, by a system simulator, the transmission power of the current cell and the neighboring cell, so that the transmission power of the current cell and the neighboring cell does not satisfy any condition of cell reselection.

10. The method for testing a cell reselection capability of a terminal according to claim 9, wherein the adjusting, by a system simulator, the transmission power of the current cell and the neighboring cell, so that the transmission power of the current cell and the neighboring cell does not satisfy any condition of cell reselection comprises:

adjusting, by the system simulator, the transmission power of the current cell to be equal to the transmission power of the neighboring cell.

11. A base station for testing a cell reselection capability of a terminal, configured to adjust a terminal to camp on a current cell and to enter a high-speed mobile mode or an intermediate-speed mobile mode;

adjust transmission power of the current cell and transmission power of a neighboring cell so that a condition of reselection from the current cell to the neighboring cell in the high-speed mobile mode or in the intermediate-speed mobile mode is met, and maintain the adjusted transmission power for at least a preset time threshold;

and then detect whether the terminal has a cell reselection capability in the high-speed mobile mode or in the intermediate-speed mobile mode by detecting whether the terminal camps on the neighboring cell; when the terminal camps on the neighboring cell, it is determined that the terminal has a cell reselection capability in the high-speed mobile mode or in the intermediate-speed mobile mode; otherwise when the terminal fails to camp on the neighboring cell, it is determined that the terminal does not have a cell reselection capability in the high-speed mobile mode or in the intermediate-speed mobile mode, wherein the transmission power of the current cell and the neighboring cell is adjusted, so that a condition of reselection from the current cell to the neighboring cell in the high-speed mobile mode or in the intermediate-speed mobile mode is met by: reducing the transmission power of the current cell and/or increasing the transmission power of the neighboring cell, so that reference signal energy levels of the neighboring cell and the current cell satisfy the condition of reselection from the current cell to the neighboring cell in the high-speed mobile mode or in the intermediate-speed mobile mode, wherein a reference signal energy level of a cell corresponds to transmission power of the cell, wherein the base station is configured for adjusting the terminal to camp on the current cell and to enter the high-speed mobile mode or the intermediate-speed mobile mode by:

adjusting the transmission power of the current cell and the neighboring cell for many times, so that the terminal switches between the current cell and the neighboring cell for many times and enters the high-speed or intermediate-speed mobile mode, and then camps on the current cell, wherein the transmission power of the current cell and the neighboring cell is adjusted repeatedly, either making the transmission power of the current cell far greater than the transmission power of the neighboring cell, or making the transmission power of the neighboring cell far greater than the transmission power of the current cell, such that the terminal performs cell reselection and switches between the current cell and the neighboring cell for a number of times within a period of time Tcr, and then the transmission power of the current cell is adjusted to be far greater than the transmission power of the neighboring cell, making the terminal camp on the current cell, wherein system information sent by the base station to the terminal includes a first integer (Ncr-h), a second integer (Ncr-m), and the time value (Tcr), with Ncr-h>Ncr-m; wherein the terminal enters the intermediate-speed mobile mode when the number of times is greater than the Ncr-m and less than the Ncr-h, or the terminal enters the high-speed mobile mode when the number of times is greater than the Ncr-h.

12. The base station for testing a cell reselection capability of a terminal according to claim 11, wherein the base station is further configured to preset the time threshold; the preset time threshold is an intermediate-speed time threshold or a high-speed time threshold; the intermediate-speed time threshold is greater than a cell reselection time interval value in the intermediate-speed mobile mode, and the high time threshold is greater than a cell reselection time interval value in the high-speed mobile mode.

13. The base station for testing a cell reselection capability of a terminal according to claim 11, wherein the base station is further configured to, after having maintained the adjusted transmission power for at least the preset time threshold and before detecting whether the terminal camps on the neighboring cell, adjust the transmission power of the current cell and the neighboring cell so that the transmission power of the current cell and the neighboring cell does not satisfy any condition of cell reselection.

* * * * *

UNITED STATES PATENT AND TRADEMARK OFFICE
CERTIFICATE OF CORRECTION

| | | |
|---|---|---|
| PATENT NO. | : 9,191,876 B2 | Page 1 of 1 |
| APPLICATION NO. | : 13/879796 | |
| DATED | : November 17, 2015 | |
| INVENTOR(S) | : Wei Ma | |

It is certified that error appears in the above-identified patent and that said Letters Patent is hereby corrected as shown below:

On the Title page, under the heading designated (74) Attorney, Agent or Firm, replace "Oppendahl" with --Oppedahl--.

Signed and Sealed this
Third Day of May, 2016

Michelle K. Lee
*Director of the United States Patent and Trademark Office*